G. K. V. JOHANSON.
APPARATUS FOR CAUSING PULSATION OF AIR.
APPLICATION FILED MAY 19, 1919.
1,363,878.
Patented Dec. 28, 1920.
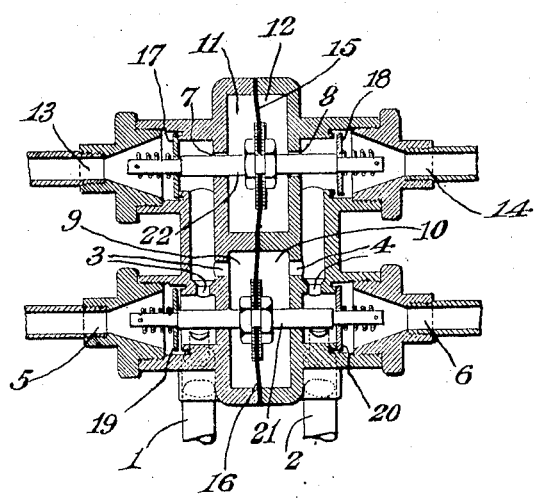

UNITED STATES PATENT OFFICE.

GEORG KARL VILHELM JOHANSON, OF STOCKHOLM, SWEDEN.

APPARATUS FOR CAUSING PULSATION OF AIR.

1,363,878. Specification of Letters Patent. Patented Dec. 28, 1920.

Application filed May 19, 1919. Serial No. 298,249.

*To all whom it may concern:*

Be it known that I, GEORG KARL VILHELM JOHANSON, engineer, residing at Stockholm, Sweden, have invented certain new and useful Improvements in Apparatus for Causing Pulsation of Air, of which the following is a specification.

In order to automatically establish alternate periods of vacuum and atmospheric pressure in two conduits, each of said conduits is alternately put in communication with a vacuum conduit and an atmospheric conduit by means of valves, controlled by diaphragms, said diaphragms in certain intervals of time having a reciprocating motion in such a manner, that for each of the two conduits the vacuum conduit is closed, when the atmospheric conduit is opened, and vice versa. This apparatus may be applied to milking machines, but I do not confine my claims thereto, as I wish to protect the invention however used.

On the drawing a central section of an apparatus according to the present invention is shown.

1 and 2 indicate the two conduits, in which alternately vacuum and atmospheric pressure is to be established. In communication with each of said conduits a vacuum conduit 5 and 6 respectively and an atmospheric conduit 13 and 14 respectively can be put by means of automatically operating valves 19, 17, and 20, 18 respectively. The valves 19 and 20, controlling the vacuum conduits 5 and 6, are mounted on a common spindle 21, connected with a diaphragm 16, dividing a casing of the apparatus in two chambers 9 and 10. In a similar manner the valves 17 and 18, controlling the atmospheric conduits 13 and 14, are mounted on a common spindle 22, connected with a diaphragm 15, dividing a second casing of the apparatus in two chambers 11 and 12. A free communication is established between the chamber 9 and the conduit 1 through the holes 3, and between the chamber 10 and the conduit 2 through the holes 4. The chamber 11 communicates with the conduit 1 through a contracted or throttled opening 7, which may be formed around the valve spindle 22, and the chamber 12 communicates with the conduit 2 in a similar manner through a contracted or throttled opening 8, which may be formed around the valve spindle 22. A passage in continuation of conduit 1 extends within the frame or casting of the apparatus between the casings and the valves 19 and 17 and a like passage extends from conduit 2 between the casings and valves 20 and 18. The openings 3, 4, 7 and 8 are made through the inner walls of these passages which are also the walls of the casings. These passages are essentially parts of conduits 1 and 2.

The device operates in the following manner. In the position of parts, shown on the drawing, the valve 19 of the vacuum conduit 5 is open, whereas the valve 17 of the atmospheric conduit 13 is closed. The valve 20 of the vacuum conduit 6 is closed, whereas the valve 18 of the atmospheric conduit 14 is open. In the conduit 1 thus vacuum is prevailing, and also in the diaphragm chamber 9, communicating therewith, whereas in the conduit 2 and in the diaphragm chamber 10, communicating therewith, atmospheric pressure is prevailing. The valves 19 and 20 take the positions shown, as a vacuum is prevailing on one side of the diaphragm 16 and atmospheric pressure on the opposite side of said diaphragm, owing to which fact the diaphragm 16 is kept to the left on the drawing. The valve 17 is however closed, as the diaphragm 15, reciprocating owing to the alternate differences of pressures on its two sides, has reached its end position to the right. The diaphragm 15 soon begins to move to the left, as the vacuum from the conduit 1 gradually is transmitted to the diaphragm chamber 11 through the small opening 7, whereas simultaneously the atmospheric pressure is transmitted from the conduit 2 to the diaphragm chamber 12 through the small opening 8. The diaphragm 15 thus is caused to move to the left on the drawing, so that the valve 17 in the atmospheric conduit 13 is opened and the valve 18 in the atmospheric conduit 14 is closed. In the conduit 1 atmospheric pressure thus instantly will be prevailing instead of vacuum, and also in the diaphragm chamber 9, whereby, as atmospheric pressure still is prevailing in the diaphragm casing 10 and thus on the opposite side of the diaphragm 16, said diaphragm 16 is subjected to the same pressure on its two sides. As now atmospheric pressure is prevailing on one side of the valve 20 and vacuum on its opposite side, said valve will open, so that vacuum is transmitted from the vacuum conduit 6 to the conduit 2. The valve 19 in the vacuum conduit 5 is simultaneously closed and the diaphragm 16 is moved to the right on the drawing.

Gradually vacuum is transmitted from the conduit 2 to the diaphragm chamber 12 through the small opening 8, whereas simultaneously atmospheric pressure from the conduit 13 is transmitted to the diaphragm chamber 11, so that the diaphragm 15 is caused to move to the right to the position shown on the drawing, causing the valve 17 to be closed and the valve 18 to be opened. The atmospheric pressure from the conduit 14 is then instantly transmitted to the conduit 2 and the diaphragm chamber 10, so that the same pressure will be prevailing on both sides of the diaphragm 16. The valve 19 will then be opened by the atmospheric pressure in the conduit 1, causing the diaphragm 16 to be moved to the left to the position shown on the drawing, whereas the vacuum is transmitted from the vacuum conduit 5 to the conduit 1. The course will then be repeated.

Having now particularly described my invention and set forth in which manner the same is to be carried out, what I claim is:

1. In an apparatus for establishing a pulsing motion of air in two conduits, means for automatically and alternately connecting each of said conduits with a vacuum conduit and with an atmospheric conduit.

2. In combination with atmospheric conduits and vacuum conduits, two additional conduits, valves controlling communication between the latter conduits and the atmospheric and vacuum conduits and reciprocating diaphragms controlling said valves, the aforesaid elements being arranged for alternately connecting each of the two additional conduits to a vacuum conduit and an atmospheric conduit.

3. In an apparatus for establishing a pulsing motion of air in two conduits, the combination of said conduits with a casing, a diaphragm, dividing the said casing in two chambers, means of free communication between each of said chambers and each of said conduits, two vacuum conduits, two valves actuated by said diaphragm and controlling communication between each of said two conduits and each of said two vacuum conduits, a second casing, a second diaphragm, dividing the said second casing in two chambers, means of throttled communication between each of said chambers and each of said two conduits, two atmospheric conduits, and two valves, actuated by said second diaphragm and controlling communication between each of said two conduits and each of said two atmospheric conduits.

4. In an apparatus for establishing a pulsing motion of air in two conduits, the combination of said conduits with a casing, a diaphragm, dividing the said casing in two chambers, means of free communication between each of said chambers and each of said two conduits, two vacuum conduits, two valves, each controlling communication between each of said two conduits and each of two vacuum conduits, a spindle on which said valves are mounted in common connected with said diaphragm and operating in opposite senses, a second casing, a second diaphragm, dividing the said second casing in two chambers, means of throttled communication between each of said chambers and each of said two conduits, two valves, two atmospheric conduits each controlling communication between each of said two conduits and each of said two atmospheric conduits, a common spindle on which said valves are mounted, said valves being connected with said second diaphragm and operating in opposite senses.

5. In apparatus for the purpose stated, a pair of casings, in combination with a pair of diaphragms dividing each of said casings into two chambers, a pair of atmospheric conduits communicating respectively with the chambers of one of said casings, a pair of valves governing respectively the flow through said conduits and connected to the diaphragm of said casing to move therewith, a pair of vacuum conduits correspondingly arranged with regard to the chambers of the other casing, a pair of valves moving with the diaphragm of the latter casing, a pair of conduits 1 and 2 and passages extending from them respectively on opposite sides of the casings and between them and the valves, each passage being provided with an opening through the wall of one of the casings into the proximate chamber and also with a more restricted opening into the corresponding chamber of the casing, compelling a slower flow of air for the purpose set forth.

6. In apparatus for the purpose set forth, a pair of casings, a pair of diaphragms dividing each casing into two chambers, two pairs of valves, each pair having connections to one of said diaphragms and moving therewith, a pair of atmospheric conduits and a pair of vacuum conduits governed respectively by said pair of valves, and a pair of conduits 1 and 2 having connection through a free opening with one of the chambers of one of the casings and by a more restricted opening with one of the chambers of the other casing.

In testimony whereof I have signed my name to this specification.

GEORG KARL VILHELM JOHANSON.

Witnesses:
WALDEMAR BOMAN,
A. BIORCK.